(12) United States Patent
Savicki, Jr.

(10) Patent No.: US 6,989,489 B1
(45) Date of Patent: Jan. 24, 2006

(54) MODULAR DEVICE WALL PLATE

(75) Inventor: Gerald R. Savicki, Jr., Syracuse, NY (US)

(73) Assignee: Pass & Seymour, Inc., Syracuse, NY (US)

( * ) Notice: Subject to any disclaimer, the term of this patent is extended or adjusted under 35 U.S.C. 154(b) by 0 days.

(21) Appl. No.: 10/726,128

(22) Filed: Dec. 2, 2003

Related U.S. Application Data

(60) Provisional application No. 60/439,370, filed on Jan. 9, 2003.

(51) Int. Cl.
*H02G 3/08* (2006.01)

(52) U.S. Cl. .................. 174/50; 174/53; 174/59; 220/3.2; 220/3.3; 200/293

(58) Field of Classification Search ............ 174/50, 174/48, 49, 53, 59, 57, 66, 67; 220/3.2, 3.3, 220/3.92, 3.8, 3.94, 241, 4.02, 242, 4.01; 439/535, 536, 107; 200/293, 297, 5 R
See application file for complete search history.

(56) References Cited

U.S. PATENT DOCUMENTS

| | | | | | |
|---|---|---|---|---|---|
| 2,433,917 | A | * | 1/1948 | McCartney | 174/53 |
| 3,707,697 | A | * | 12/1972 | Izumi | 439/107 |
| 3,879,101 | A | * | 4/1975 | McKissic | 439/535 |
| 4,485,282 | A | * | 11/1984 | Lee | 174/53 |
| 4,636,914 | A | * | 1/1987 | Belli | 174/53 |
| 4,725,249 | A | * | 2/1988 | Blackwood et al. | 439/535 |
| 5,036,168 | A | * | 7/1991 | Kikuchi et al. | 174/53 |
| 5,500,487 | A | * | 3/1996 | Leon | 174/53 |
| 5,562,493 | A | * | 10/1996 | Ferrill et al. | 439/536 |
| 5,637,000 | A | * | 6/1997 | Osterbrock et al. | 439/107 |
| 5,783,787 | A | * | 7/1998 | Data | 200/5 R |
| 5,990,436 | A | * | 11/1999 | Balaban et al. | 200/559 |
| 6,309,248 | B1 | * | 10/2001 | King | 439/535 |
| 6,623,296 | B2 | * | 9/2003 | Okamoto | 439/536 |
| 6,814,611 | B1 | * | 11/2004 | Torres | 439/535 |
| 6,870,099 | B1 | * | 3/2005 | Schultz et al. | 174/53 |

\* cited by examiner

*Primary Examiner*—Angel R. Estrada
(74) *Attorney, Agent, or Firm*—Daniel P. Malley; Bond, Schoeneck & King PLLC

(57) ABSTRACT

The present invention includes a modular electrical device for use in an electric circuit. The modular electrical device includes a wall plate defining a first opening, and a housing configured to be disposed within the first opening. The housing is configured to accommodate a frame member selected from a plurality of frame members. Each frame member is configured to accommodate at least one wiring assembly. The modular electrical device further includes an electrical wiring assembly chosen from a plurality of electrical wiring assemblies. Each of the plurality of electrical wiring assemblies has a different functional configuration, and each of the plurality of electrical wiring devices being sized to fit in the selected frame member. The modular electrical device further includes a set of terminal contacts selected from a plurality of sets of terminal contacts. Each set of terminal contacts is matched to accommodate one of the plurality of electrical wiring assemblies.

27 Claims, 2 Drawing Sheets

MODULAR DEVICE WALL PLATE

CROSS REFERENCE TO RELATED APPLICATIONS

This application claims the benefit of priority under 35 U.S.C. § 119(e) of Provisional U.S. patent application Ser. No. 60/439,370 filed on 9 Jan. 2003, the content of which is relied upon and incorporated herein by reference in its entirety.

BACKGROUND OF THE INVENTION

1. Field of the Invention

The present invention relates to an electrical wiring device and more particularly to an electrical wiring device suitable for commercial and residential use.

2. Background of the Invention

Typically, wall mounted conventional electrical devices for use in residential or commercial applications such as offices require a wall plate specifically configured for the electrical device. For example, each switch, receptacle, or hallway light typically employs its own wall plate opening. Installation of multiple devices may require multiple gang wall plates and multiple gang wall boxes. This requires that an electrical installer carry an inventory of an assortment of wall plates and wall boxes, thereby incurring unnecessary cost.

Thus, there is a need for a modular electrical device that reduces the need for specialized installation, thereby reducing inventory cost and simplifying the installation process.

SUMMARY OF THE INVENTION

In one embodiment, the present invention includes a modular electrical device for use in an electric circuit. The modular electrical device includes a wall plate defining a first opening, and a housing configured to be disposed within the first opening. The housing is configured to accommodate a frame member selected from a plurality of frame members. Each frame member is configured to accommodate at least one wiring module. The modular electrical device further includes an electrical wiring module chosen from a plurality of electrical wiring modules. Each of the plurality of electrical wiring modules has a different functional configuration, and each of the plurality of electrical wiring devices being sized to fit in the selected frame member. The modular electrical device further includes a set of terminal contacts selected from a plurality of sets of terminal contacts. Each set of terminal contacts is matched to accommodate one of the plurality of electrical wiring modules.

DETAILED DESCRIPTION OF THE INVENTION

Figure 1:
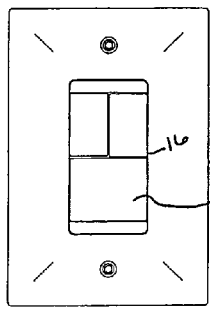
FIG. 1 is front elevation view of the modular electrical device of the present invention.

Reference will now be made in detail to the present embodiments of the invention, examples of which are illustrated in the accompanying drawings. Whenever possible, the same reference numerals will be used throughout the drawings to refer to the same or like parts.

One embodiment of the electrical device of the present invention is shown in FIG. 1 and is designated generally throughout by the reference numeral 10. The electrical device 10 includes a wall plate 12 and an electrical wiring device 14.

The wall plate includes a single rectangular 16 opening configured to receive any one electrical wiring device 14 from a plurality of differently configured electrical wiring devices. In an alternative embodiment, the opening 16 in the wall plate 12 is sized to accommodate a plurality of electrical wiring devices 14 installed in a single wall box in an abutting relationship to one another.

Each of the electrical wiring devices 14 includes a ground strap 15. The ground strap 15 is made from an electrically conductive metal and is configured for mounting the electrical device 10 into a conventional wall box (not shown). The strap 15 is further configured to receive the housing 17 of the electrical wiring device 14. The housing 17 includes a body 19, and a frame 21 that work in cooperation to provide mounting places for the components of the electrical device 10, such as terminals and electrical switch components.

It will be readily apparent to those of ordinary skill in the art that, in view of the teachings disclosed herein, modifications to the described embodiment may be made to incorporate a variety of electrical wiring devices without departing from the scope of the present disclosure. Both the body 19 and frame 21 are made from a non-electrically conductive material, such as, for example plastic and may be made for example, by a molding process, such as, for example an injection molding process.

The body 19 is configured to receive a plurality of terminals 23. The terminals 23 fit into openings in the sides of the body 19. The openings are configured to securely hold the terminals 23 in predetermined positions that electrically isolate the terminals 23 from one another. Each of the terminals 23 is configured for the coupling of an electrically conductive wire thereto.

Figure 10:
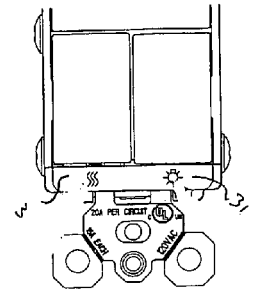
FIG. 10 is an enlarged fragmentary view of an electrical wiring device of the present invention showing a blank marked with identifying symbols.
Figure 2:
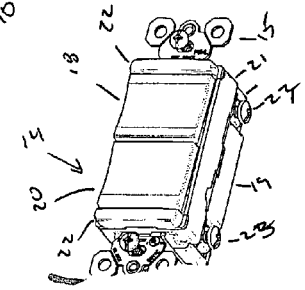
FIG. 2 a perspective view of an one embodiment of an electrical wiring device used in the modular electrical device of the present invention.

Turning to FIG. 2, one possible electrical wiring device 14 for use in the modular electrical device 10 of the present invention is shown. The electrical wiring device 14 includes two switches 18, 20 and two modular blanks 22. The two switches 18, 20 may be either single pole or three-way switches. Thus, the electrical wiring device 14 may include two single pole switches, two three-way switches or a single pole and a three-way switch. The blanks 22 are removably engageable members that aid in alignment of the electrical wiring device 14 within the opening 16 of the wall plate 12 of the modular electrical device 10. FIG. 10 shows a detail of the installation of a single blank 22. As shown in FIG. 10, the blank 22 may include identifying symbols 31. In an alternative embodiment the blanks 22 do not include any identifying markings.

Figure 3:
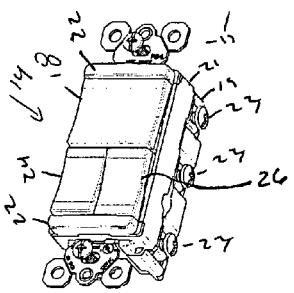
FIG. 3 a perspective view of an alternative embodiment of an electrical wiring device used in the modular electrical device of the present invention.

Turning to FIG. 3, another possible electrical wiring device 14 for use in the modular electrical device 10 of the present invention is shown. The electrical wiring device 14 shown in FIG. 3 includes three switches 18, 24, 26 and two blanks 22. The switches 18, 24, 26 may be either single pole or three-way switches. Thus, the electrical wiring device may be configured to include three single pole switches, two single pole switches and one three-way switch, one single pole switch and two three-way switches or three three-way switches. The blanks 22 are removably engageable members that aid in alignment of the electrical wiring device 14 within the opening 14 of the wall plate 12 of the modular electrical device 10.

Figure 4:
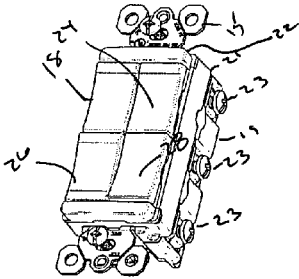
FIG. 4 a perspective view of an alternative embodiment of an electrical wiring device used in the modular electrical device of the present invention.

Turning to FIG. 4, another possible electrical wiring device 14 for use in the modular electrical device 10 of the present invention is shown. The electrical wiring device 14 shown in FIG. 4 includes four switches 18, 24, 26, 28 and two blanks 22. The four switches 18, 24, 26, 28 may be either single pole or three-way switches. Thus, the electrical wiring device may be configured to include four single pole switches, three single pole switches and one three-way switch, two single pole switch and two three-way switches, one single pole and three three-way switches or four three-way switches. The blanks 22 are removably engageable members that aid in alignment of the electrical wiring device 14 within the opening 16 of the wall plate 12 of the modular electrical device 10.

Figure 5:
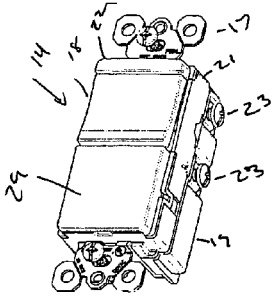
FIG. 5 a perspective view of an alternative embodiment of an electrical wiring device used in the modular electrical device of the present invention.

Turning to FIG. 5, another possible electrical wiring device 14 for use in the modular electrical deice 10 of the present invention is shown. The electrical wiring device 14 includes a switch 18, a placard holder 29, and a single blank 22. This electrical wiring device is similar to ones described in co-pending U.S. patent application Ser. No. 10/726,137, entitled Electrical Switch with Placard and Remote Use Indicator, which is hereby incorporated by reference in its entirety. The switch 18 may be either a single pole switch or a three-way switch. The placard holder is configured to display a removable media that may include text, tactile indicia, images, or combinations thereof. The single blank 232 is used to align the electrical device 14 within the opening 16 of wall plate 12.

Figure 6:
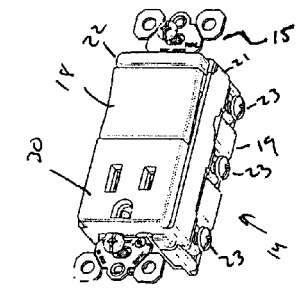
FIG. 6 a perspective view of an alternative embodiment of an electrical wiring device used in the modular electrical device of the present invention.

Turning to FIG. 6, another possible electrical wiring device 14 for use in the modular electrical device 10 of the present invention is shown. The embodiment of the electrical wiring device 14 shown in FIG. 6 includes a switch 18, a receptacle 30 and a single blank 22. The switch 18 may be either a single pole or a three-way switch. The receptacle may be configured to include ground fault interruption protection. The single blank 22 is used to align the electrical device 14 within the opening 16 of the wall plate 12.

Figure 7:
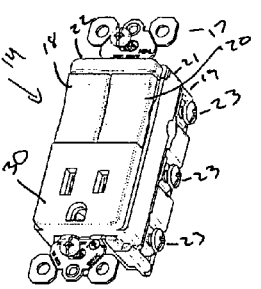
FIG. 7 a perspective view of an alternative embodiment of an electrical wiring device used in the modular electrical device of the present invention.

Turning to FIG. 7, another possible electrical wiring device 14 for use in the modular electrical device 10 of the present invention is shown. The embodiment of the electrical wiring device 14 shown in FIG. 7 includes two switches 18, 20 mounted in a side-by-side configuration, a receptacle 30 and a single blank 22. The two switches 18, 20 may be either single pole or three-way switches. Thus, the electrical wiring device 14 shown in FIG. 7 may be configured to include two single pole switches, a single pole switch and a three-way switch or two three-way switches. The receptacle may be configured to include a ground fault circuit interruption (GFCI) protection. The single blank 22 is used to align the electrical device 14 within the opening 16 of the wall plate 12.

Figure 8:
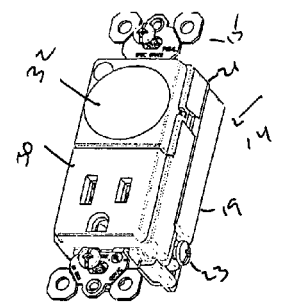
FIG. 8 a perspective view of an alternative embodiment of an electrical wiring device used in the modular electrical device of the present invention.

Turning to FIG. 8, another possible electrical wiring device 14 for use in the modular electrical device 10 of the present invention is shown. The embodiment of the electrical wiring device shown in FIG. 8 includes a hallway light 32 and a receptacle 30. The hallway light 32 is configured to provide a predetermined quantity of illumination when electrical power is supplied. The receptacle may be configured to include ground fault circuit interruption (GFCI) or arc fault circuit interrupter (AFCI) protection.

Figure 9:
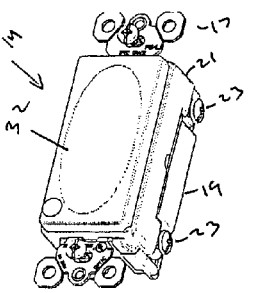
FIG. 9 a perspective view of an alternative embodiment of an electrical wiring device used in the modular electrical device of the present invention.

Turning to FIG. 9, another possible electrical wiring device 14 for use in the modular electrical terminal 10 of the present invention is shown. The embodiment of the electrical wiring device 14 shown in FIG. 9 includes a hallway light that is sized to substantially fill the opening 16 of the wall plate 12. The hallway light 32 is configured to provide a predetermined quantity of illumination when electrical power is supplied.

Figure 12:
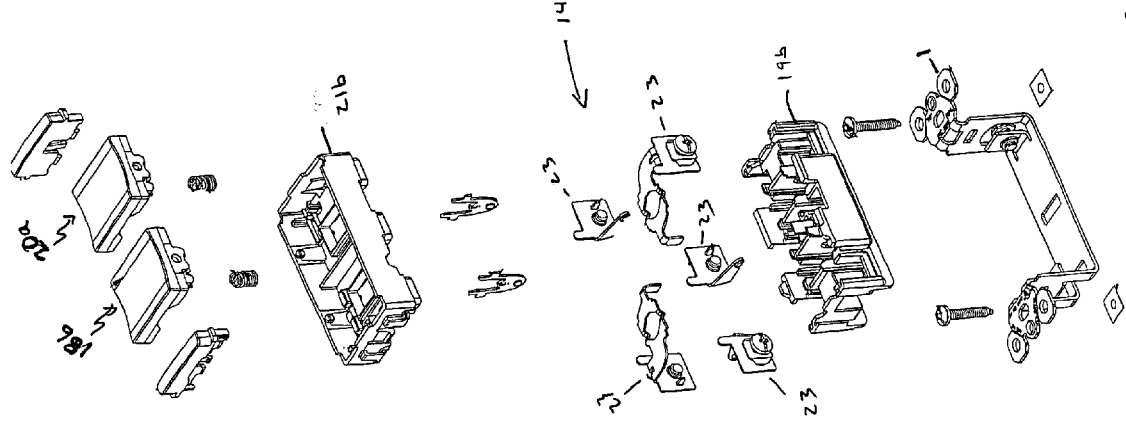
FIG. 12 is an exploded view of the electrical wiring device 14 shown in FIG. 2 in accordance with another embodiment of the invention.
Figure 11:
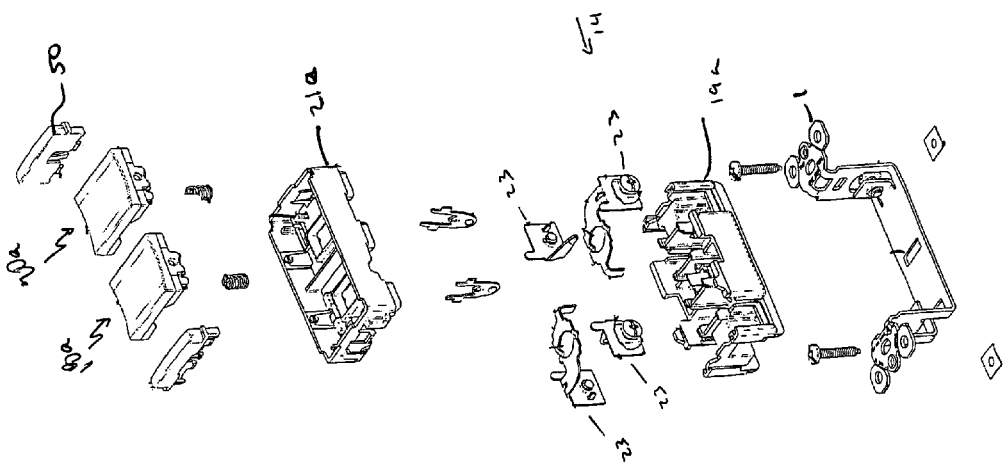
FIG. 11 is an exploded view of the electrical wiring device 14 shown in FIG. 2 in accordance with an embodiment of the invention.

FIG. 11 is an exploded view of the electrical wiring device 14 shown in FIG. 2. The two switches 18a and 20b are single pole switches. FIG. 12 is an exploded view of the electrical device 14 depicted in FIG. 2. In that embodiment, switch 18b is configured as a single pole switch and the other switch 20b is configured as a three-way switch. Reference is also made to U.S. patent application Ser. No. 10/729,566 which is incorporated herein by reference as though fully set forth in its entirety, for a more detailed explanation of these embodiments.

Comparing the body 19a of FIG. 11 with the body 19b of FIG. 12 it is evident that body 19a is configured to receive four terminals 23 and body 19b is configured to receive five terminals 23. Both body 19a and body 19b are configured to engage the ground strap 15 in an identical manner. Both body 19a and body 19b are examples of the different types of frames that may be selected to provide an electrical wiring device 14 with a desired functionality. Both body 19a and body 19b exhibit the common trait to all of the bodies used in the present invention, namely that they posses a substantially common form factor that allows a them and a complementary frame 21 to engage a specific sized opening in a wall plate 12. The complimentary frame 21 is also selected depending upon the desired functionality of the electrical wiring device 14.

FIG. 11 and FIG. 12 illustrate a removable lamp module 50 which has a form factor configured to replace blank 22. Lamp module 50 is configured to take the place of blank 22 in the various embodiments of the invention as described herein. Lamp module 50 is electrically coupled to terminals 23. Lamp module 50 may operate as a remote use indicator that emits light when power is applied to the load. Alternatively, lamp module 50 may operate as a locator for device 10 by emitting light even when power is not provided to the load. A locator directs users to the location of the electrical wiring device in a darkened room. Lamp module may also act as a power indicator that emits light when device 10 is electrically energized. Lamp module 50 may include a circuit that provides a continuous emission of light, or a circuit that generates a blinking light. The lamp indicator and module is similar to that described in co-pending U.S. patent application Ser. No. 10/726,173 which is incorporated herein by reference as though fully set forth in its entirety.

Whereas the switch in the various embodiments have been characterized as single pole or three way switches, a switch can be in any number of configurations, for example, two single pole switches.

Thus, different combinations of frame 21 and body 19 pairs may be assembled to form an almost limitless array of electrical wiring devices to provide a desired functionality.

As will be readily appreciated by those skilled in the art, the choice of functionality of the electrical wiring device 14 determines which frame 21 and body 19 are selected. The overriding consideration is that no matter which frame 21 and body 19 are chosen, that when they are combined to form a housing the 17, the housing exhibits a consistent form factor allowing the housing to be engage the wall plate 12 regardless of the functional design of the electrical wiring device 14.

It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents.

I claim:

1. A modular electrical device for use in an electric circuit, the device comprising:
    a housing configured to accommodate a frame member selected from a plurality of frame members, each frame being configured to accommodate at least one wiring assembly;
    an electrical wiring assembly chosen from a plurality of electrical wiring assemblies, each of the plurality of electrical wiring assemblies having a different functional configuration, each of the plurality of electrical wiring assemblies being sized to fit in the selected frame member;
    a set of terminal contacts selected from a plurality of sets of terminal contacts, each set of terminal contacts being matched to accommodate one of the plurality of electrical wiring assemblies; and
    a wall plate defining a first opening, the housing configured to be disposed within the first opening.

2. The modular electrical device of claim 1 wherein said electrical wiring assembly includes a first switch and a second switch.

3. The modular electrical device of claim 2 wherein at least one of said first switch and said second switch is a single pole switch.

4. The modular electrical device of claim 2 wherein at least one of said first switch and said second switch is a three-way switch.

5. The modular electrical device of claim 2 wherein said electrical wiring device further including third switch.

6. The modular electrical device of claim 5 wherein at least one of said first switch, said second switch and said third switch is a single pole switch.

7. The modular electrical device of claim 5 wherein at least one of said first switch said second switch and said third switch is a three-way switch.

8. The modular electrical device of claim 5 wherein said electrical wiring device further includes a fourth switch.

9. The modular electrical device of claim 8 wherein at least one of said first switch, said second switch, said third switch and said fourth switch is a single pole switch.

10. The modular electrical device of claim 8 wherein at least one of said first switch said second switch, said third switch and said fourth switch is a three-way switch.

11. The modular electrical device of claim 2 wherein said electrical wiring assembly further includes a receptacle.

12. The modular electrical device of claim 11 wherein said receptacle includes at least one of ground fault circuit interrupt or arc fault circuit interrupt.

13. The modular electrical device of claim 1 wherein said electrical wiring assembly includes a receptacle.

14. The modular electrical device of claim 13 wherein said electrical wiring assembly further includes a first switch.

15. The modular electrical device of claim 14 wherein said first switch is a single pole switch.

16. The modular electrical device of claim 14 wherein said first switch is a three-way switch.

17. The modular electrical device of claim 13 wherein said electrical wiring device further includes a hallway light.

18. The modular electrical device of claim 1 wherein said electrical wiring device includes a hallway light.

19. The modular electrical device of claim 1 wherein the frame has a second opening, further comprising at least one blank, the blank being configured to be disposed in the second opening.

20. The modular electrical device of claim 19 further comprising a lamp assembly, the lamp assembly being configured to be disposed in the second opening.

21. The modular electrical device of claim 20, wherein the lamp assembly includes a remote use indicator.

22. The modular electrical device of claim 21, wherein the frame includes a placard holder.

23. The modular electrical device of claim 20, wherein the lamp assembly includes a locator for indicating the location of the modular electrical device.

24. The modular electrical device of claim 20, wherein the lamp assembly indicates the coupling of electrical power to the modular electrical device.

25. The modular electrical device of claim 1 wherein the frame has a second opening, further comprising an interchangeable assembly configured to be disposed in the second opening.

26. The modular electrical device of claim 25 wherein the interchangeable assembly is a blank.

27. The modular electrical device of claim 25 wherein the interchangeable assembly is a lamp assembly.

* * * * *